United States Patent [19]

Steiner et al.

[11] 4,214,039

[45] Jul. 22, 1980

[54] POLYPROPYLENE FILM WITH PRIMER OF A WATER DISPERSED EPOXY RESIN COATING

[75] Inventors: Robert H. Steiner, Rochester; Gary L. Duncan, Pittsford; Robert E. Touhsaent, Fairport, all of N.Y.

[73] Assignee: Mobil Oil Corporation, New York, N.Y.

[21] Appl. No.: 32,073

[22] Filed: Apr. 23, 1979

Related U.S. Application Data

[63] Continuation of Ser. No. 828,585, Aug. 29, 1977, abandoned.

[51] Int. Cl.$^2$ .............................................. B32B 27/38
[52] U.S. Cl. ................................... 428/414; 428/411; 428/520; 428/522; 428/910
[58] Field of Search .............. 428/414, 518, 522, 520, 428/411, 910; 260/836, 837 R

[56] References Cited

U.S. PATENT DOCUMENTS

| | | | |
|---|---|---|---|
| 3,484,336 | 12/1969 | Aulik et al. | 428/414 |
| 3,695,922 | 10/1972 | Chujo | 428/336 |
| 3,719,629 | 3/1973 | Martin | 260/33.2 FP |

*Primary Examiner*—Ellis P. Robinson
*Attorney, Agent, or Firm*—Charles A. Huggett; James D. Tierney

[57] ABSTRACT

Thermoplastic films, such as polypropylene, are coated with a vinylidene chloride based multipolymer to enhance the physical properties of such films. The coating is anchored to the base film by first applying a primer coating directly on the film surface, which primer coating comprises a water dispersed epoxy resin composition.

12 Claims, No Drawings

POLYPROPYLENE FILM WITH PRIMER OF A WATER DISPERSED EPOXY RESIN COATING

CROSS REFERENCE TO RELATED APPLICATIONS

The present invention is a continuation application of U.S. application Ser. No. 828,585 which was filed Aug. 29, 1977 now abandoned.

BACKGROUND OF THE INVENTION

1. Field of the Invention

The present invention relates to the employment of multipolymers of vinylidene chloride as thin coatings for oriented polypropylene packaging films. Such coatings increase the resistance of polypropylene films to the transmission of gases and vapors thereby enhancing the films' utility when packaging products which may be oxygen or moisture sensitive. Additionally, the present invention provides a primer coating for such polypropylene films whereby the adhesion of the vinylidene chloride multipolymer coating to the films is improved.

2. Brief Description of the Prior Art

The employment of multipolymers of vinylidene chloride as thin coatings for oriented thermoplastic films such as polypropylene film has been recognized in the prior art as an effective means of increasing the heat sealability of such films and additionally increasing the resistance of the films to the transmission of gases and vapors. This latter characteristic is particularly useful when such films are employed to package products which are sensitive to, or attacked by, oxygen or moisture.

Of particular importance when such thermoplastic film substrates are coated with these vinylidene chloride multipolymer compositions is to insure that adhesion of the coating layer to the polypropylene substrate is adequate. For example, in many packaging applications, it is necessary for the coated film to be heat sealed either to itself or to other films to form a tightly closed package. If the coating adhesion to the base film is inadequate, the packages are liable to prematurely open when subjected to stress.

In general, vinylidene chloride base multipolymer compositions, containing at least 50% vinylidene chloride by weight, do not adhere well to polypropylene film surfaces, even when the latter have been subjected to well known pretreatment operations such as, for example, treatment by corona discharge, flame, or oxidizing chemicals. Accordingly, it has been found necessary to apply a thin intermediate primer layer to the surface of the polypropylene base film before applying the vinylidene chloride multipolymer topcoat generally in the form of an aqueous dispersion or latex.

Primers which have been used in the past include solutions of polyurethane resins dissolved in organic solvents. See, for example, U.S. Pat. No. 3,023,126. Such materials have been found to serve the desired function, i.e., insure adequate adhesion between the base film and the top coating. However, primer compositions based upon polyurethane require solvents to dissolve the urethane polymers and such solvents pose problems. For example, they are expensive, flammable, frequently toxic, and would lead to environmental contamination if discharged into the atmosphere. Alternatively, solvent recovery systems are quite expensive. Furthermore, polyurethane resin solutions are extremely sensitive to moisture and require great care to insure exclusion of water during storage and use.

SUMMARY OF THE INVENTION

In accordance with the present invention it has been found that an epoxy resin composition comprising (a) a liquid epoxy resin, preferably emulsified or dissolved in water, and (b) a water-soluble amine-modified acrylic resin can be applied to treated oriented polypropylene film, dried in a conventional coating oven in a very short time and topcoated with an aqueous dispersion, i.e. a latex of a vinylidene chloride multipolymer, and the topcoating is subsequently dried to produce a coated packaging film. It has been found that such films have excellent properties, including resistance to water immersion, and may be employed either alone or in combination with other films to package materials which may be sensitive to deterioration by exposure to moisture and/or atmospheric oxygen.

DESCRIPTION OF SPECIFIC EMBODIMENTS

1. Epoxy Resin

Epoxy resins may be defined as glycidyl ethers of polyhydroxy compounds, and generally shown below as:

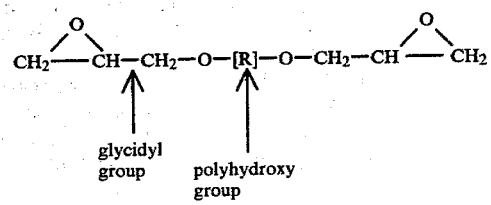

Typical polyhydroxy compounds which may be used include bisphenol A (common name for 4,4'-isopropylidene bisphenol), ring substituted bisphenol A, resorcinal, hydroquinone, phenol-formaldehyde novolac resins, aliphatic diols such as ethylene glycol, propylene glycol, 1,4-butanediol, 1,6 hexanediol glycerol, poly(oxyethylene)glycol, poly(oxypropylene)glycol, and the like.

The preferred epoxy resins in this invention are those based on bisphenol A:

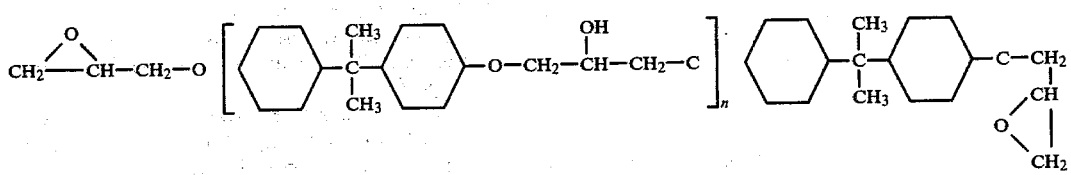

where n may range from 0 to 1. Epoxy resins of this type are commonly classified by their epoxy equivalent weight (EEW) which is defined as the weight of resin in grams which contains one gram equivalent of epoxy groups. Resins with an E.E.W. ranging from 170 to 280 may be used in the present invention, but the preferred range is 180 to 210.

Other types of epoxy resins based on aliphatic diols and having E.E.W.'s ranging from about 150 to about 380 may be used in mixtures with bisphenol A resins where increased flexibility of the resultant primer layer is desired.

A variation in the composition of the epoxy resin component is one in which a hydantoin compound is substituted for the bisphenol A. For example, 1,1-dimethyl hydantoin may be employed as a low molecular weight epoxy resin since resins based on this material are completely water soluble thereby eliminating the necessity for emulsification.

1,1-dimethyl hydantoin

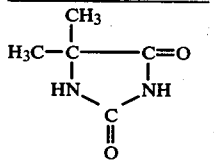

Typical epoxy resin based on 1,1-dimethylhydantoin; n = 0-1

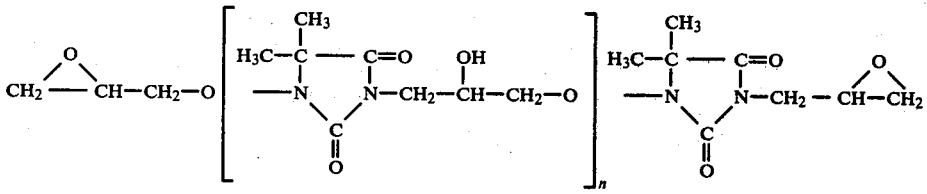

Although the specific structure of the epoxy resin is not critical to the primer employed in the present invention, important considerations in the selection of the epoxy resin revolve around its physical state, for example it must be liquid and capable of being readily dispersed or dissolved with the second component or curing agent as described hereinbelow. If the epoxy resin is of low viscosity, it may be stirred directly into the second component, i.e. curing agent, however it is preferred to employ the epoxy resin as an aqueous emulsion.

2. Polymeric Curing Agent

The second component in the epoxy primer compositions of the present invention is a curing agent and specifically an amino modified acrylic polymer which is water soluble. The preferred material is described in U.S. Pat. No. 3,719,629, the disclosure of which is incorporated herein by reference, and may be generically described as an acidified aminoethylated interpolymer having pendant amino alkylate groups of the general formula:

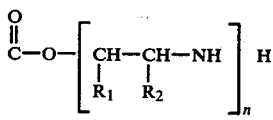

wherein $R_1$ and $R_2$ are hydrogen or lower alkyl radicals and the average value of n is in the range of about 1.0–2.5.

This material is produced as described in the hereinabove patent, by polymerizing acrylate, methacrylate, styrene or other suitable monomers with sufficient methacrylic or acrylic acid to give a —COOH content of about 7.5 to about 12.5%. Solvent polymerization techniques are preferred. The polymer is then reacted with ethylene imine monomer and acidified with hydrochloric acid to render the polymer water soluble. A commercially available product, identified by the manufacturer as XD-7080 comprises 50% resin, 43% ethyl ether of ethylene glycol and 7% water. This clear viscous solution is capable of being diluted infinitely with water. The resin has an amine hydrogen equivalent weight of about 250. Other physical properties include:

| | |
|---|---|
| % Non-Volatiles | 49±0.5 |
| Viscosity, cps | 4000–7000 |
| Specific Gravity, lbs/gal | 8.8 |
| pH | 5.0–5.6 |
| SPI Skin Rating | 3 |
| Gardner Color, Maximum | 5 |
| Dilute Viscosity[1], cps | 125–325 |

[1]150g XD-7080 + 195g deionized water.

In one embodiment of the present invention, a liquid epoxy resin is emulsified in a solution of the XD-7080 curing agent by rapid stirring, the resultant dispersion is diluted with water to the desired concentration for coating, usually from about 2 up to about 25% solids. Although it is difficult to obtain a stable dispersion at low concentrations since the epoxy resin tends to separate in large globules rather than remain in minute emulsified droplets, it has been found that usable products may be produced using this system.

In a preferred embodiment, the epoxy resin is emulsified in water employing a non-ionic emulsifying agent. A stable, fine particle size emulsion containing about 50% epoxy resin may be readily prepared utilizing known prior art techniques. This emulsion may be subsequently stirred into the solution of the curing agent hereinabove discussed, either before or after dilution to the desired concentration for coating, to form a stable dispersion.

When a completely water soluble epoxy resin is employed, simple mixing of aqueous solutions of the resin and the curing agent is sufficient to produce a clear, infinately dilutable, coating solution.

When mixing the epoxy resin with the curing agent, it is generally preferred to use a stoichiometric equivalent balance of epoxy and amine groups. However, it has been found that the stoichiometric ratio may be varied over a wide range, from about 1 epoxy to about 3 amine through 3 epoxy to 1 amine and preferably from about 1 epoxy to 2 amine through about 2 epoxy to 1 amine, without seriously affecting the product's usefulness as a primer coating.

3. Wetting Agents

The solution or dispersion of epoxy resin and curing agent when applied to a treated film may not "wetout" uniformly, especially when such materials are applied in very thin layers. As a result, the dry but as yet uncured liquid mixture may retract into droplets or "islands." When such structures are topcoated with vinylidene chloride latex the resultant films usually have a poor appearance with hazy streaks or blotches. Although such an appearance may not be deleterious in certain applications, it is quite undesirable where a clear, transparent packaging film is desired.

It has been found that small amounts of wetting aids, from about 0.5 up to about 10% by weight of the total primer solids can greatly improve coating "wet-out" and produce films with good appearance, i.e.—without hazy streaks or blotches. Conventional prior art nonionic wetting agents may be employed for this purpose, but it has been found that optimum results are obtained utilizing relatively high boiling point, i.e.—above 100° C., partially water-soluble organic compounds having hydrophilic groups attached to hydrophobic groups. Examples of such compounds include the hexyl or benzyl ether of ethylene glycol, the hexyl ether of diethyl glycol, butyl alcohol, hexyl alcohol, octyl alcohol, diacetone alcohol, and the like.

4 Catalysts

Although mixtures of epoxy resin and polyaminoacrylate curing agent with or without additional wetting aids will crosslink or cure to form an insoluble, moisture resistant priming layer, it has been found advantageous in certain instances to use minor amounts of amine catalysts to enhance the rate of cure. Such catalysts include propylene diamine, hexamethylene diamine, diethylene triamine, triethylamine tetramine, tetraethylene pentamine and the like. In addition to aliphatic amines, aliphatic polymeric amines may be employed such as polyethyleneimine and polypropyleneimine. Also, aromatic amines including tri(dimethyl aminomethyl) phenol have been employed successfully.

The catalyst may be employed in a ratio of 0.5 to 15 parts per 100 parts of dry epoxy resin.

The major advantage attained by use of a curing catalyst is a more rapid attainment of moisture resistance in the final topcoated film product.

The hereinabove described amine catalysts may be used advantageously in mixtures. An especially desirable mixture is a blend of 3 parts by weight of tri(dimethylaminomethyl) phenol with about 7 parts by weight of polyethyleneimine having a molecular weight of about 50 thousand. When such a combination of curing catalyst is added to the dispersion or solution of epoxy resin and aminoacrylate curing agent, topcoated films are produced which exhibit excellent moisture resistance and very good optical properties, including a low haze level.

In the following examples, oriented isotactic polypropylene film was used as the substrate being coated. It will be understood, however, that thermoplastic films including other polyolefins such as polyethylene and polybutene, and copolymers and blends thereof, may also be employed in the practice of the present invention. The thickness of the substrate film may vary within a wide range, but is preferably from about 0.50 up to about 1.75 mils in thickness. Prior to the coating operation, the film is subjected to pretreatment utilizing, for example, a corona discharge treatment to produce a film surface with a wetting tension of about 37–43 dynes/cm.

The aforedescribed primer dispersion is prepared by adding the required amount of the epoxy resin emulsion to the curing agent, which has been diluted with water to the desired concentration and thoroughly mixed. The optional components in the primer dispersion as hereinabove discussed such as amine catalysts, wetting aids and the like, may then be added with stirring. The total solids concentration used is generally dependent upon the coating application technique. In general, total solids concentration of from about 5% up to about 25% are desirable.

The primer dispersion is applied utilizing standard coating techniques to one side of the electronically treated substrate base film so that a dry coating weight of from about 0.05 up to about 0.25 grams/1000 square inches of film is obtained. The coated film is subsequently passed through a hot air oven to completely remove the water and solvent present. Residence times from 1 to about 6 seconds in the oven at 200°–230° F. are usually sufficient to remove essentially all of the liquid phase. Subsequently, the film may be wound in a roll for storage before topcoating, or typically it may be coated "inline" by applying a topcoating such as a vinylidene chloride copolymer latex utilizing standard coating techniques such as gravure, roll coating, and the like. The topcoated film is subsequently dried by passing it through a conventional hot air oven.

The composition of the vinylidene chloride copolymer latex which is employed as a topcoating material is not critical to the practice of this invention. Commercially available vinylidene chloride latexes having a vinylidene chloride content of at least 50% and preferably from about 75% to about 92% may be employed. The other ethylenically unsaturated comonomers may include alpha, beta ethylenically unsaturated acids such as acrylic and methacrylic acids; alkyl esters containing 1–18 carbon atoms of said acids such as methyl methacrylate, ethyl acrylate, butyl acrylate, etc.; alpha, beta ethylenically unsaturated nitriles such as acrylonitrile, methacrylonitrile; monovinyl aromatic compounds such as styrene; and vinyl chloride.

The amount of vinylidene chloride coating applied to the substrate film may be varied over a wide range depending upon the specific properties desired in the final film product. Coating weights of from about 1 up to about 6 grams per 1000 square inches may be used. If a two-sided coated film is desired the treating/priming/topcoating process can be repeated, either in-line or out of line.

In the following Table 1 data are presented on the anchoring effectiveness of the primer coating. The following is a description of the tests employed, as reported in the Table, to demonstrate the effectiveness of the primer composition of the present invention in achieving a moisture resistant bond between the vinylidene chloride multipolymer layer and the treated polypropylene substrate.

1. Humidity resistance of heat seals:

This test is primarily applicable to coated films where a high level of heat seal strength between coated surfaces is required. Two sets of heat sealed strips are prepared using any desired laboratory heat seal apparatus.

One set is allowed to stand ambient room conditions and the other is exposed to a highly humid environment, e.g. 100° F. and 90% relative humidity. After a period of three days, the first set is separated by peeling on conventional test equipment whereby the force required to peel one strip from the other can be measured quantitatively. The other test strip is removed from the environmental chamber and peeled immediately. The fraction of peel strength remaining after exposure to high humidity is a measure of the effectiveness of the primer. Typically, the formulations of this invention will show a retention of greater than 75% of the initial seal strength.

2. Water Immersion Tests:

For coated films not required to possess heat sealability in themselves, the effectiveness of the primer can be measured by immersing strips of the film in water at room temperature. After 24 hours, the strips are removed, patted dry with paper toweling, and a strip of pressure sensitive transparent tape is firmly applied, then stripped off. The fraction of the coating layer removed by the tape is estimated visually. Preferred formulations of this invention show little or no lifting of the coating layer.

3. Boiling Water Test:

This very stringent test is performed in the same manner as the water immersion test, except that boiling water is used and the immersion period is one hour. Generally preferred films made according to this invention show little or no lifting of the coating.

The following specific examples are presented hereinbelow to illustrate specific embodiments of the present invention and hence are illustrative of this invention and not intended to be construed in a limitative sense.

EXAMPLE 1

Employment of Emulsified Epoxy Resin with Acidified Aminoethylated Interpolymer as Primer Coating An epoxy resin emulsion was prepared by mixing the following ingredients in an intensive mixer:

(a) 275 grams of a low molecular weight liquid resin having an E.E.W. of 188, formed by the reaction of epichlorohydrin and bisphenol A and having a structural formula as set forth in an antecedent paragraph entitled "Epoxy Resin", and identified by the manufacturer as EPON-828;

(b) 10 grams of a non-ionic emulsifier comprising octyl phenol polyethylene oxide having about 40 molecules of ethylene oxide and identified by the manufacturer as IGEPAL CO-897; and (c) 215 grams of water.

To 12.2 grams (50% non-volatiles) of the above emulsion was added:

(d) 14.1 grams (50% non-volatiles) of a curing agent comprising an acidified amino-ethylated interpolymer having the structural formula as set forth under an antecedent paragraph entitled "Polymeric Curing Agent" wherein $R_1$ and $R_2$ are both hydrogen. The curing agent is identified by the manufacturer, Dow Chemical Co., as XD 7080 and had the following physical properties:

| | |
|---|---|
| Amine Hydrogen Equivalent Weight | 250 |
| % Non-Volatiles | 49±0.5 |
| Viscosity, cps | 4,000–7,000 |
| Specific Gravity, lbs/gal | 8.8 |
| pH | 5.0–5.6 |
| SPI Skin Rating | 3 |
| Gardner Color, Maximum | 5 |
| Dilute Viscosity, cps | 125–325 |

(150 g. XD 7080 and 195 g. deionized water); and (e) 175 grams of water.

The mixture was a stable emulsion which showed no signs of settling over an eight hour period. The mixture was coated onto the surface of a biaxially oriented polypropylene film which had been treated by the conventional corona discharge method. The coating was applied using a 200 mesh gravure roll and the coated film was dried in a hot air oven at 220° F. with a dwell time of 5 seconds.

The primed film was next topcoated with a commercially available saran latex, identified by the manufacturer as Dow XD 7874, which had a pH of 8.5 after adjustment with ammonia. The latex comprised an interpolymer of about 88% vinylidene chloride, 7% methyl acrylate, and 5% acrylonitrile, by weight. To the topcoating latex was added a finely divided aqueous dispersion of carnauba wax (4 phr) and powered talc (0.5 phr). An oven temperature of 220° F. and a dwell time of 12 seconds was used to dry the topcoated film. A coating weight of about 2 grams per 1000 in$^2$ was obtained.

The properties of the coated film are summarized in Table 1. The coating had fairly good adhesion to the substrate polypropylene film but poor appearance, i.e. streaks and haze.

EXAMPLE 2

(Use of a Wetting Aid)

Example 1 was repeated, except that 3.7 grams of monohexyl ether of ethylene glycol, i.e. Hexyl Cellosolve, was added to the primer dispersion. As shown in Table 1, the resultant film had greatly improved appearance, but still had a fairly high haze level and only fair boiling water adhesion.

EXAMPLE 3

(Employment of a Wetting Aid Together with a Polyethyleneimine Catalyst)

Example 2 was repeated except that 4.0 grams of a 10% aqueous solution of polyethylene imine having a molecular weight of about 50,000, and a pH adjusted to 6.8 with ammonia water was added.

The resultant film had greatly improved adhesion, i.e. no lifting of the topcoat in boiling water and good appearance except for a moderately high haze level.

EXAMPLE 4

(Use of an Aromatic Amine Catalyst)

Example 3 was repeated except that 2.1 grams of a 10% solution of the acetic acid salt of (dimethyl aminomethyl) phenol, identified by the manufacturer as DMP-30, with a pH adjusted to 6.8 was added. As shown in Table 1, the resulting film had excellent topcoat adhesion, but had streaks and fairly high haze level.

EXAMPLE 5

(Combined Use of Polymeric Amine and Aromatic Amine Catalysts)

Example 2 was repeated, except that the polyethyleneimine solution of Example 3 and the aromatic amine solution of Example 4 were both added in identical quantities as used in Examples 3 and 4. As shown in Table 1 the resultant film had very good coating adhesion properties and very good appearance.

EXAMPLE 6

(Use of a Water Soluble Epoxy Resin)

Example 5 was repeated, except that 6.6 grams of a water soluble hydantoin epoxy resin, identified by the manufacturer Ciba-Geigy Corporation as XB 2793, having the structural formula as set forth in an antecedant paragraph and the following physical properties:

| Appearance | Pole yellow Liquid |
|---|---|
| Viscosity, cps at 25° C. | 2,500 |
| Epoxy Value, equiv. 100g. | 0.70 |
| Weight per epoxide | 138 | was used in place of the bisphenol A epoxy resin.

The compounded primer solution was clear and stable. As shown in Table 1, the resultant film had very good coating adhesion properties and very good appearance.

EXAMPLE 7

(Use of a Conventional Non-Polymeric Amine Curing Agent with Epoxy Resin)

A primer coating dispersion was prepared in accordance with Example 1, except that 22.8 grams of a 10% aqeos solution of tetraethylene pentamine was substituted for the acidified aminoethylated interpolymer curing agent. As shown in Table 1, when treated polypropylene film was primed with this dispersion and topcoated in accordance with the procedure outlined in Example 1, the topcoated film had very poor appearance and very poor coating adhesion.

TABLE I

| | Properties of Coated Film Produced | | | | |
|---|---|---|---|---|---|
| Ex. No. | Primer Wt. (g/1000 in²) | Appearance | Haze Level | Water* Adhesion | Boiling* Water Adhesion |
| 1 | 0.1 | Streaks | Fair | 0 | 2 |
| 2 | 0.1 | Fair | Fair | 0 | 2 |
| 3 | 0.1 | Fair | Fair | 0 | 0 |
| 4 | 0.1 | Streaks | Poor | 0 | 0 |
| 5 | 0.1 | Good | Good | 0 | 0 |
| 6 | 0.1 | Good | Good | 0 | 0 |
| 7 | 0.1 | Very Poor | Very Poor | 2 | 4 |

*Ratings
0 = no coating lift
1 = slight coating lift
2 = moderate coating lift
3 = severe coating lift
4 = complete coating lift Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A thermoplastic film substrate having a topcoat of a heat sealable vinylidene chloride multi-polymer containing at least 50% by weight of vinylidene chloride, said film having a primer coat, intermediate said substrate film surface and said topcoat, comprising the reaction product of an acidified aminoethylated vinyl polymer and an epoxy resin.

2. A thermoplastic film in accordance with claim 1 wherein said epoxy resin is a glycidyl ether of a member selected from the group consisting of phenols, bisphenols, ring substituted bisphenols, resorcinol, hydroquinone, phenol formaldehyde novolac resins, polyoxypropylene glycol, ethylene glycol, propylene glycol, 1–4 butanediol, 1–6 hexanediol glycerol, glycol, lower alkyl substituted hydantoin and mixtures thereof.

3. A thermoplastic film in accordance with claim 1 wherein said acidified aminoethylated vinyl polymer has pendant amino alkylate groups of the following formula:

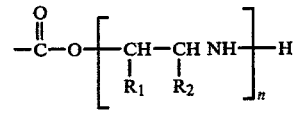

where $R_1$ and $R_2$ are independently selected from the group consisting of hydrogen and lower alkyl radicals of one to four carbon atoms and the average value of n is from about 1.0 to about 2.5 and wherein the interpolymer before aminoethylation contains at least 3 percent by weight pendant —COOH Groups.

4. A thermoplastic film in accordance with claim 1 wherein said vinylidene chloride multi-polymer comprises from about 75% to about 92% by weight of vinylidene chloride and from about 25% up to about 8% by weight of at least one member selected from the group consisting of acrylic acid, methacrylic acid, alkyl esters of acrylic acid or methacrylic acid, acrylonitrile, methacrylonitrile, styrene, vinyl chloride and mixtures thereof.

5. A thermoplastic film in accordance with claim 1 wherein said primer coat contains an amine curing catalyst.

6. A thermoplastic resin in accordance with claim 2 wherein said epoxy resin has an epoxy equivalent weight of from about 170 to about 280.

7. A polypropylene film substrate having a topcoat consisting of a sealable vinylidene chloride polymer containing at least 50% by weight of vinylidene chloride, said polypropylene film having a primer coat intermediate said substrate film surface and said topcoat, said primer coat consisting of the reaction product of an acidified aminoethylated vinyl polymer and an epoxy resin.

8. A polypropylene film in accordance with claim 7 wherein said epoxy resin is a glycidyl ether of a member selected from the group consisting of phenols, bisphenols, ring substituted bisphenols, resorcinol, hydroquinone, phenol formaldehyde novolac resins, polyoxypropylene glycol, ethylene glycol, propylene glycol, 1–4 butanediol, 1–6 hexanediol glycerol, glycol, lower alkyl substituted hydantoin and mixtures thereof.

9. A polypropylene film in accordance with claim 7 wherein said acidified aminoethylated vinyl polymer has pendant amino alkylate groups of the following formula:

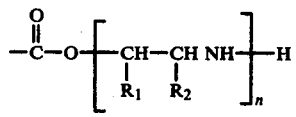

wherein $R_1$ and $R_2$ are independently selected from the group consisting of hydrogen and lower alkyl radicals of one to four carbon atoms and the average value of n is from about 1.0 to about 2.5 and wherein the interpolymer before aminoethylation contains at least 3 percent by weight pendant —COOH Groups.

10. A polypropylene film in accordance with claim 7 wherein said vinylidene chloride polymer comprises from about 75% to about 92% by weight of vinylidene chloride and from about 25% up to about 8% by weight of at least one member selected from the group consisting of acrylic acid, methacrylic acid, alkyl esters of acrylic acid or methacrylic acid, acrylonitrile, methacrylonitrile, styrene, vinyl chloride and mixtures thereof.

11. A polypropylene film in accordance with claim 7 wherein said primer coat contains an amine curing catalyst.

12. A polypropylene film in accordance with claim 8 wherein said epoxy resin has an epoxy equivalent weight of from about 170 to about 280.

* * * * *